(12) United States Patent
Strobel (10) Patent No.: US 10,180,169 B2
(45) Date of Patent: Jan. 15, 2019

(54) DRIVING DEVICE FOR MOVING A TAILGATE

(71) Applicant: Brose Fahrzeugteile GmbH & Co. KG, Bamberg, Bamberg (DE)

(72) Inventor: Ulrich Strobel, Weitramsdorf (DE)

(73) Assignee: Brose Fahrzeugteile GMBH & Co. KG, Bamberg, Bamberg (DE)

(*) Notice: Subject to any disclaimer, the term of this patent is extended or adjusted under 35 U.S.C. 154(b) by 0 days.

(21) Appl. No.: 15/512,815

(22) PCT Filed: Oct. 6, 2015

(86) PCT No.: PCT/EP2015/073025
§ 371 (c)(1),
(2) Date: Mar. 20, 2017

(87) PCT Pub. No.: WO2016/055460
PCT Pub. Date: Apr. 14, 2016

(65) Prior Publication Data
US 2017/0248183 A1    Aug. 31, 2017

(30) Foreign Application Priority Data

Oct. 8, 2014 (DE) .......................... 10 2014 220 414

(51) Int. Cl.
*F16D 65/18* (2006.01)
*F16D 63/00* (2006.01)
(Continued)

(52) U.S. Cl.
CPC ............ *F16D 65/186* (2013.01); *B60J 5/101* (2013.01); *E05F 15/622* (2015.01); *F16D 55/46* (2013.01);
(Continued)

(58) Field of Classification Search
CPC .... F16D 65/186; F16D 55/146; F16D 65/125; F16D 65/2121; F16D 65/18; F16D 2125/48; E05F 15/622; B60J 5/101
See application file for complete search history.

(56) References Cited

U.S. PATENT DOCUMENTS 3,312,319 A    4/1967    Carroll et al.
4,417,356 A    11/1983   Hoffman
(Continued)

FOREIGN PATENT DOCUMENTS

CN    101900174 A    12/2010
DE        1198621      8/1965
(Continued)

OTHER PUBLICATIONS

Japanese Notification of Reasons for Rejection dated Apr. 10, 2018 issued in corresponding Japanese Patent Application No. 2017-518849, 4 pages, with English translation (3 pages).

*Primary Examiner* — Melanie Torres Williams
(74) *Attorney, Agent, or Firm* — Lewis Roca Rothgerber Christie LLP (57) ABSTRACT

A driving device for moving a tailgate of a vehicle, comprising a permanent magnet brake, which comprises a stationary portion, a first braking element, which is rotatable relative to the stationary portion about a rotational axis, and a second braking element, which is arranged in a rotationally fixed manner on the stationary portion, is axially offset from the first braking element along the rotational axis and cooperates with the first braking element in order to generate a braking force. The first braking element and/or the second braking element have a permanent magnet or are formed by a permanent magnet, a magnetic attraction force acts between the first braking element and the second braking element axially along the rotational axis. Axially between the first braking element and the second braking element is arranged a friction element, which is in frictional contact with the first braking element and the second braking element.

15 Claims, 8 Drawing Sheets

(51) Int. Cl.
*E05F 15/622* (2015.01)
*B60J 5/10* (2006.01)
*F16D 55/46* (2006.01)
*F16D 65/12* (2006.01)
*F16D 121/18* (2012.01)
*F16D 125/48* (2012.01)

(52) U.S. Cl.
CPC ......... *F16D 63/002* (2013.01); *F16D 65/125* (2013.01); *E05Y 2900/546* (2013.01); *F16D 2121/18* (2013.01); *F16D 2125/48* (2013.01)

(56) References Cited

U.S. PATENT DOCUMENTS

| | | |
|---|---|---|
| 2006/0175172 A1 | 8/2006 | Frieb-Preis et al. |
| 2006/0289821 A1 | 12/2006 | Ritter |
| 2012/0193184 A1 | 8/2012 | Chiang et al. |
| 2014/0224045 A1 | 8/2014 | Kummer |

FOREIGN PATENT DOCUMENTS

| | | |
|---|---|---|
| DE | 1450172 | 6/1969 |
| DE | 102005005648 A1 | 8/2006 |
| DE | 10 2005 030 053 A1 | 12/2006 |
| DE | 102009034123 A1 | 2/2011 |
| DE | 202010009010 U1 | 2/2011 |
| EP | 0693633 A2 | 1/1996 |
| EP | 1534971 B1 | 1/2008 |
| FR | 2818304 A1 | 6/2002 |
| JP | 55126031 U | 9/1980 |
| JP | 57204334 A | 12/1982 |
| JP | 2014-523497 A | 9/2014 |
| WO | WO2007/120132 A1 | 10/2007 |
| WO | WO2011/064713 A1 | 6/2011 |

DRIVING DEVICE FOR MOVING A TAILGATE

CROSS-REFERENCE TO A RELATED APPLICATION

This application is a National Phase Patent Application of International Patent Application Number PCT/EP2015/073025, filed on Oct. 6, 2015, which claims priority of German Patent Application Number 10 2014 220 414.3, filed on Oct. 8, 2014. The contents of both of which are incorporated herein by reference.

BACKGROUND

The invention relates to a driving device for moving a tailgate.

Such a driving device for moving a tailgate has a permanent magnet brake that comprises a stationary portion, a first braking element, which is rotatable relative to the stationary portion about a rotational axis, and a second braking element, which is arranged in a rotationally fixed manner on the stationary portion. The first braking element and the second braking element are mutually axially offset along the rotational axis and cooperate in order to generate a braking force.

In a permanent magnet brake of this kind, as is known, for instance, from EP 0 693 633 A2, braking elements frictionally interact, wherein the friction force is magnetically influenced. In the permanent magnet brake of EP 0 693 633 A2, for instance, a permanent magnet, which acts on a braking element in the form of a pressure plate and by means of said pressure plate produces a pressure on a stack of friction elements, is provided. In addition to the permanent magnets, an electromagnet, which can be energized to switch the braking force on or off, is provided.

A drive for moving a vehicle part is also known from FR 2 818 304. The drive has a braking device for holding the vehicle part in a set position.

In a driving device known from DE 10 2005 030 053 A1, for pivoting a flap arranged on a body of a vehicle, there is provided a braking device, in which a brake disk acted on with braking effect by a braking element is arranged on a shaft.

From EP 1 534 971 B1, a magnetic brake actuated spring clutch, in which a magnet is arranged opposite to a rotor disk, is known. In the braking device which is described there, a braking force is produced by the induction of eddy currents.

Moreover, so-called wrap spring brakes, which use a wrap spring arranged in a brake pot, are known from the prior art. Upon the transmission of a drive-side force, the wrap spring is subjected to load for the release of a system comprising the brake pot, so that a drive shaft can be driven without great braking effect of the wrap spring. By contrast, when an output-side force is applied to the drive shaft, the wrap spring is subjected to load in the direction of its system comprising the brake pot, so that the drive shaft is braked and the output-side force is dissipated without this resulting in a movement of the drive shaft.

Traditional braking devices of this type are complex and have a considerable installation space requirement. Moreover, braking devices which utilize friction for the braking are susceptible to wear and, in some circumstances, sensitive to temperature.

SUMMARY

An object of the present invention is to provide a driving device having a permanent magnet brake, which can be structured in a simple and space-saving arrangement while providing a reliable braking force.

This object is achieved by a subject having features as described herein.

According to this, the first braking element and/or the second braking element have a permanent magnet or are formed by a permanent magnet. A magnetic attraction force acts between the first braking element and the second braking element axially along the rotational axis. Between the first braking element and the second braking element is arranged a friction element, which is in frictional contact with the first braking element and the second braking element.

With the proposed permanent magnet brake of the driving device, a braking device of particularly simple structure is provided. The braking effect is obtained by a first braking element and a second braking element, which lie axially opposite each other and between which is arranged a friction element. Due to the magnetic attraction force between the first braking element and the second braking element, the friction element is, on the one hand, in frictional contact with the first braking element and, on the other hand, in frictional contact with the second braking element, so that, due to the friction during a rotary motion of the first braking element, a braking force is produced between the first braking element and the second braking element.

Between the first braking element and the second braking element, a magnetic attraction force exists. For instance, the first braking element can have a permanent magnet or be formed (in one piece) by a permanent magnet, while the second braking element has a ferromagnetic armature or is formed by a ferromagnetic armature. Alternatively, the second braking element can have a permanent magnet or be formed (in one piece) by a permanent magnet, whereas the first braking element has a ferromagnetic armature or is formed by a ferromagnetic armature. It is, however, also conceivable and possible to equip both the first braking element and the second braking element respectively with a permanent magnet or to form them by a permanent magnet, in which case the permanent magnets are poled in such a way relative to each other that a magnetic attraction force exists between the braking elements.

If one of the braking elements is configured as a ferromagnetic armature, then the braking element can be produced, for instance, from steel (having ferromagnetic properties).

In the proposed permanent magnet brake of the driving device, a braking effect is achieved due to friction of the braking elements with the interposed friction element. The size of the friction force herein derives from the contact pressure of the braking elements against the friction element. Because the axial distance between the braking elements is set by the friction element and is thus constant during operation, an at least approximately invariable magnetic attraction force between the braking elements (due to the at least approximately invariable gap between the braking elements), and thus an at least approximately constant braking force, is obtained.

By selecting the axial thickness of the friction element, it is possible to set the provided braking force.

The friction element is preferably produced from a non-magnetic material, for instance plastic. For instance, the friction element can be produced from POM (polyoxymethylene).

The first braking element and the second braking element preferably extend respectively in a disk shape about the rotational axis. The first braking element and the second braking element can be configured, for instance, respectively as an annular disk and can be arranged concentrically to the rotational axis. The braking elements are mutually axially offset such that the friction element is arranged between the braking elements.

The friction element too is in this case preferably configured in a disk shape, for instance as an annular disk concentric to the rotational axis.

The, for instance, disk-shaped friction element is advantageously connected neither to the first braking element nor to the second braking element, but rather, due to the magnetic attraction between the braking elements, enters into frictional contact, on the one hand, with the first braking element and, on the other hand, with the second braking element. Due to the friction between the braking elements and the intervening friction element, a braking force, which brakes the rotatable first braking element relative to the second braking element arranged in a rotationally fixed manner relative to the stationary portion, is produced.

In a particularly simple embodiment, the permanent magnet brake is non-switchable. By this should be understood that the magnetic attraction force between the braking elements is not variable, thus the permanent magnet brake cannot be switched between an active, braking state and a passive, non-braking state, for instance by an additional electromagnet. The magnetic attraction force between the braking elements is always active, so that an at least approximately equal braking force is always provided.

The stationary portion is formed, for instance, by a housing, which has a receiving opening for receiving the first braking element, the second braking element and the intervening friction element. The second braking element is in this case arranged in a rotationally fixed manner in the receiving opening of the housing, while the first braking element is rotatable in the receiving opening. The friction element arranged between the first braking element and braking element is preferably not held in a rotationally fixed manner in the housing, nor is it secured relative to the one or the other braking element, so that the friction element can turn relative to the housing, to the first braking element and to the second braking element.

The housing is made, for instance, of a non-magnetic material, for instance plastic. For instance, the housing is produced in two-piece configuration from a housing bottom part and a housing top part, wherein both housing parts are produced, for instance, from a partially crystalline polyamide (for example the plastic PA6.6).

For the rotationally fixed securement of the second braking element relative to the stationary portion, thus, for instance, the housing, a form closure can be created between the second braking element and the stationary portion. For instance, the disk-shaped second braking element can have on an outer, peripheral rim a radially inward pointing recess, in which a radially inward pointing projection on a circumferential surface of the housing positively engages, so that the second braking element cannot turn relative to the housing about the rotational axis.

The second braking element is secured in a rotationally fixed manner relative to the stationary portion and thus cannot rotate relative to the stationary portion about the rotational axis. The fastening of the second braking element to the stationary portion, thus, for instance, the housing, can in this case be such that an axial play exists between the second braking element and the stationary portion, thus the second braking element can move axially, by a (slight) play, relative to the stationary portion. During operation, the position of the second braking element relative to the first braking element is in this case secured, in that the first braking element and the second braking element are situated opposite each other in magnetic attraction, wherein the distance between the first braking element and the second braking element is defined by the axial thickness of the friction element, and thus a predetermined magnetic attraction force acts between the first braking element and the second braking element.

In principle, it is sufficient to provide a first braking element, which is rotatable about the rotational axis, and a second braking element, which is arranged in a rotationally fixed manner relative to the stationary portion. It is, however, also conceivable and possible to provide two second braking elements, which are arranged on both sides of the first braking element and respectively in a rotationally fixed manner relative to the stationary portion. This gives rise to an arrangement in which—viewed in the axial direction along the rotational axis—a second braking element is followed by a friction element, then the first braking element, then a further friction element and then a further second braking element.

In this case, one second braking element is arranged on an axially first side of the first braking element and another second braking element is arranged on an axially second side of the first braking element, wherein between the first braking element and the second braking elements arranged on both sides of the first braking element is respectively arranged a friction element. The first braking element and the second braking elements are situated opposite each other in magnetic attraction, so that both second braking elements are drawn toward the interposed first braking element. Due to the magnetic attraction force between the braking elements, the friction elements arranged between the braking elements enter respectively into frictional contact, on the one hand, with the first braking element and, on the other hand, with a second braking element.

Through the use of a plurality of second braking elements, which are arranged in a rotationally fixed manner relative to the stationary portion and which interact with the interposed first braking element, the braking force of the permanent magnet brake can be increased. In this way, a friction exists on both sides of the first braking element, and thus a dual braking effect.

In principle, such a structure is also extendable. In principle, more than one first braking element and more than two second braking elements can also be used, wherein between two second braking elements respectively a first braking element and, conversely, between two first braking elements respectively a second braking element is arranged. Between a first braking element and a second braking element is in this case respectively arranged a friction element, wherein the different friction elements do not necessary have to be identical, but can differ in terms of their design, for instance their thickness and their radial width.

A driving device of the type here described can be configured, for instance, as a spindle drive, in which a spindle is set in a rotary motion and a spindle nut, which is in threaded engagement with the spindle, is moved in the longitudinal direction along the spindle due to the rotary motion of said spindle. If such a driving device is not of self-locking configuration, then the permanent magnet brake serves to create a situation in which, following movement of the vehicle part, for instance the tailgate, the tailgate remains in its set position and does not move of its own accord out of its set position, for instance due to gravitational effect.

If the permanent magnet brake is non-switchable, thus provides an always at least approximately constant braking force, then an electric motor of the driving device should be dimensioned such that the motion-preventing braking force of the permanent magnet brake can be surmounted. The electric motor should thus be dimensioned accordingly.

The first braking element is, for instance, fixedly connected to an output shaft of the driving device and, upon a rotary motion of the output shaft, is moved together with the output shaft. The output shaft is turnable relative to the stationary portion, for instance the housing, of the permanent magnet brake, so that, upon a rotary motion of the output shaft, the first braking element is moved relative to the stationary portion, and thus also relative to the second braking element arranged in a rotationally fixed manner relative to the stationary portion.

In one embodiment, in which the first braking element has a permanent magnet or is formed by a permanent magnet, the first braking element is connected, for instance in a rotationally fixed manner, to a disk element, for instance a steel disk, produced from a ferromagnetic material. The first braking element is rotatable relative to the stationary portion, for instance a housing of the permanent magnet brake. The disk element is in this case connected in a rotationally fixed manner to the first braking element and, by virtue of its formation from a ferromagnetic material, can serve as a magnetic yoke in order to conduct the magnetic flux produced by the permanent magnet of the first braking element.

The disk element is in this case preferably not in frictional contact with the stationary portion, though, in principle, it is also conceivable and possible to provide a friction between the disk element and the stationary portion, for instance a housing portion, in order to additionally increase the friction forces of the permanent magnet brake.

In principle, it is sufficient if the permanent magnet of the first and/or of the second braking element points with a magnetic pole toward the respectively other braking element, so that a magnetic attraction exists between the braking elements. In this way, the permanent magnet of one braking element can have, for instance, two magnetic poles (a North pole and a South pole), which are mutually axially offset along the rotational axis, so that the permanent magnet points with a magnetic pole toward another braking element.

In one embodiment, it is, however, also conceivable and possible that the permanent magnet of the first and/or of the second braking element has a plurality of magnetic poles, which are mutually offset along a peripheral direction about the rotational axis. For instance, on the permanent magnet can be provided a plurality of magnetic pole pairs mutually offset along the peripheral direction, respectively comprising a North pole and a South pole. Viewed along the peripheral direction, on the braking element assigned to the permanent magnet there is thus obtained an arrangement of magnetic poles in which a North pole is followed by a South pole and the South pole is in turn followed by a North pole. By selecting the number of magnetic pole pairs, it is possible to set the braking force of the permanent magnet brake, wherein the braking force fundamentally increases with the number of magnetic pole pairs.

In principle, one magnetic pole pair on the permanent magnet is sufficient. It is, however, also conceivable and possible to provide, in a concrete embodiment, three, four or five magnetic pole pairs, for instance.

BRIEF DESCRIPTION OF THE DRAWINGS

The idea on which the invention is founded shall be explained in greater detail below on the basis of the illustrative embodiments represented in the figures.

DETAILED DESCRIPTION

Figure 1:
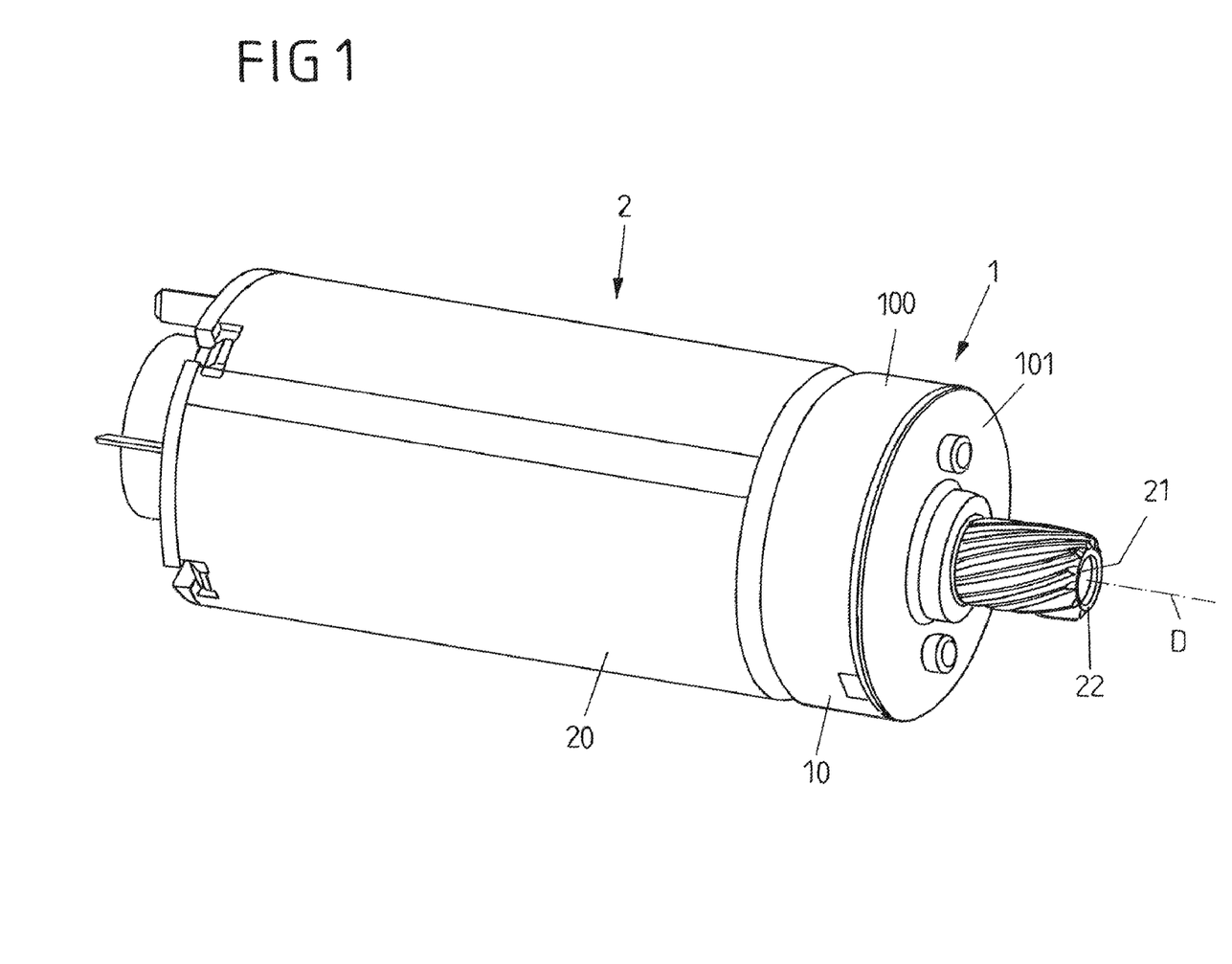
FIG. 1 shows a general view of a driving device having a permanent magnet brake.

FIG. 1 shows in a perspective view a driving device 2, which has a permanent magnet brake 1. The driving device 2 is configured as an electric motor and has in a housing 20 a stator which is stationary relative to the housing 20 and a rotor which is rotatable relative to the stator. The rotor is rotatable about a rotational axis D and drives an output shaft 21, on which is arranged a pinion element 22 for driving, for instance, a subordinate gear mechanism for the movement of a vehicle part.

Figure 4:
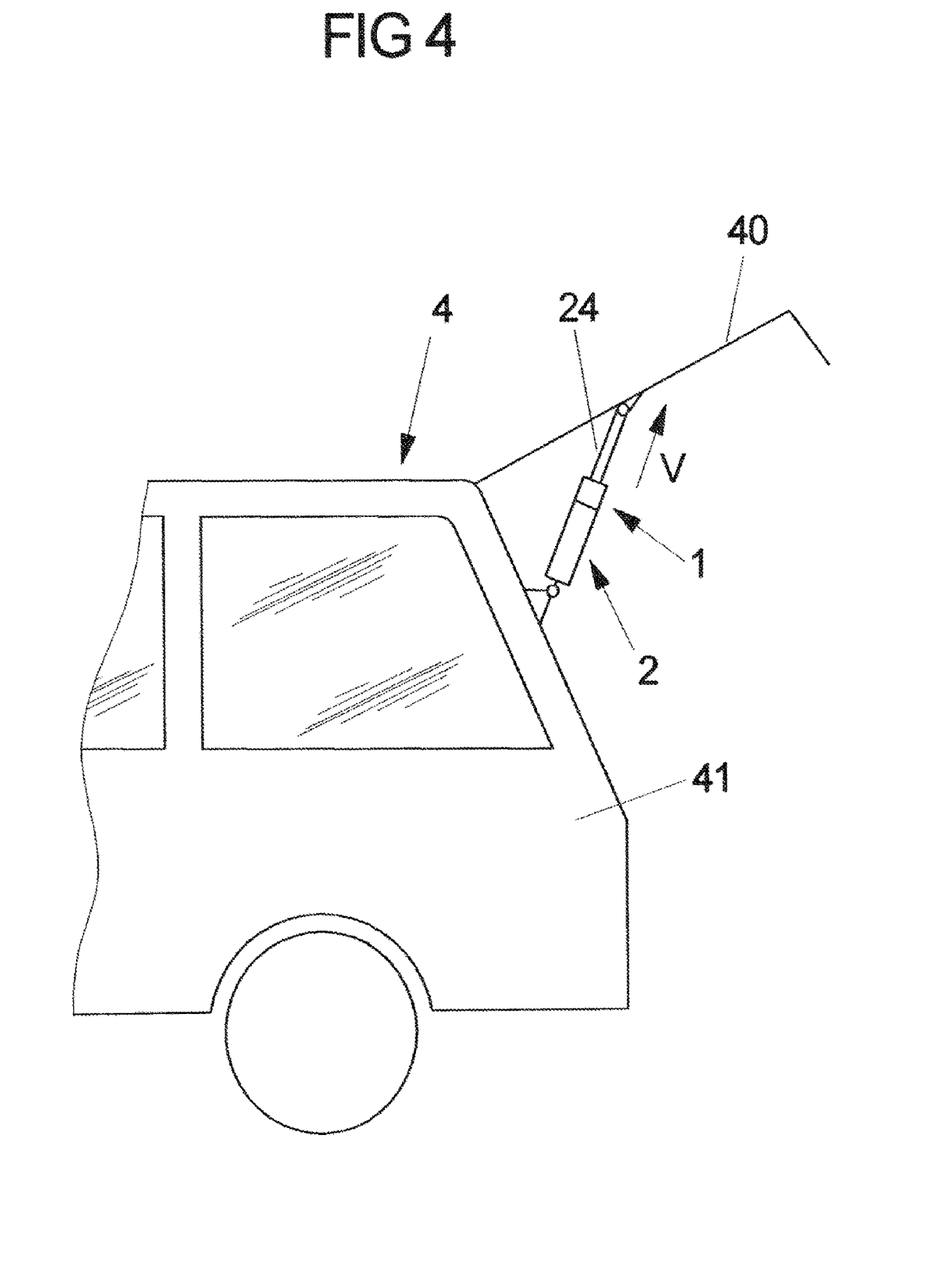
FIG. 4 shows a schematic view of a vehicle having a driving device for moving a tailgate.

As can be seen from FIG. 4, the driving device 2 serves to move a tailgate 40 of a vehicle. The driving device 2 acts between the tailgate 40 and a body 41 of the vehicle 4 in a manner which is known per se. In this case, the driving device 2 can be configured, for instance, as a spindle drive, in which the pinion element 22 arranged on the output shaft 21 is configured as a spindle rotatable about the rotational axis D or drives a spindle via a suitable gear mechanism. In this case, a spindle nut is in threaded engagement with the spindle, which spindle nut, by rotary motion of the spindle about the rotational axis D, can be moved longitudinally along the rotational axis D in order in this way to displace a push rod 24 and thereby move the tailgate 40.

In principle, a driving device 2 of the type here described can, however, also be used to move vehicle parts of a totally different type.

Figure 2A:
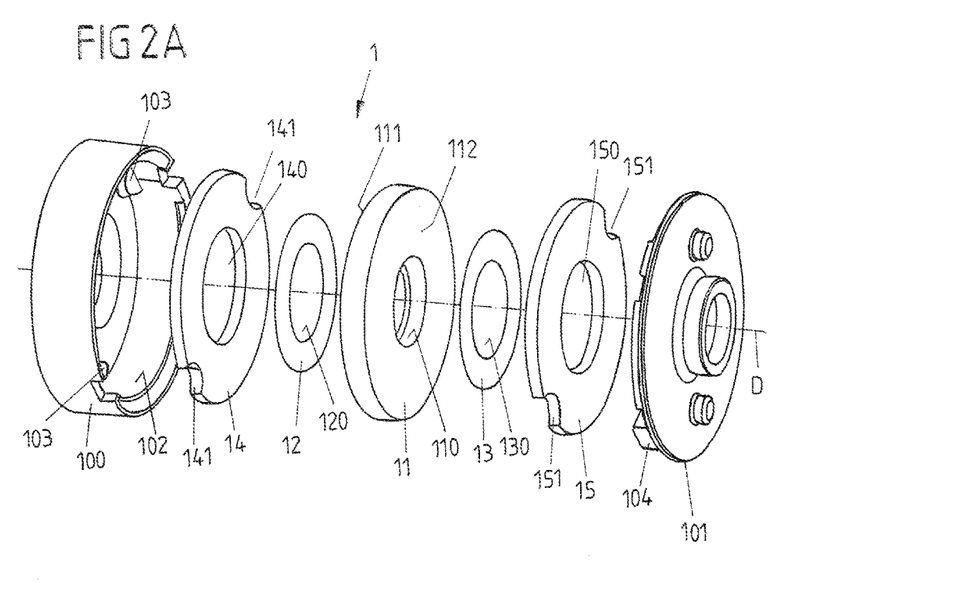
FIGS. 2A, 2B show perspective exploded views of the permanent magnet brake.
Figure 2B:
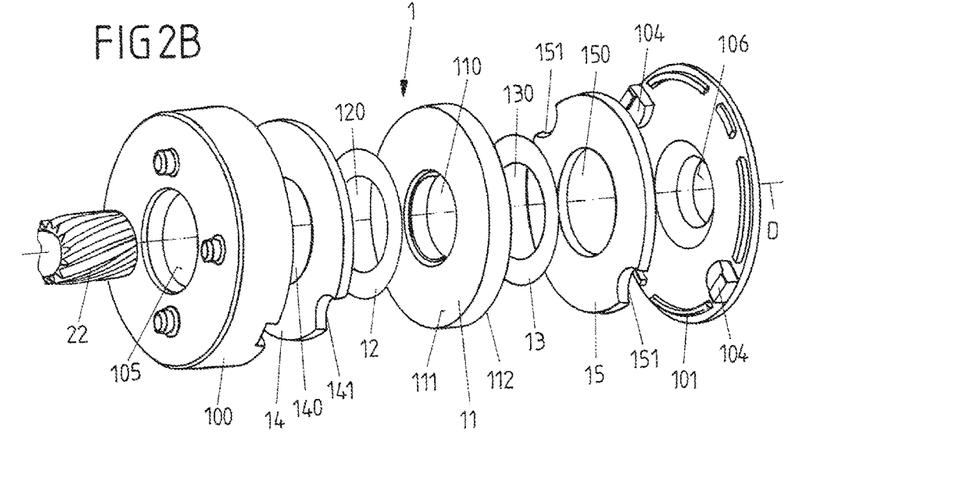
Figure 3:
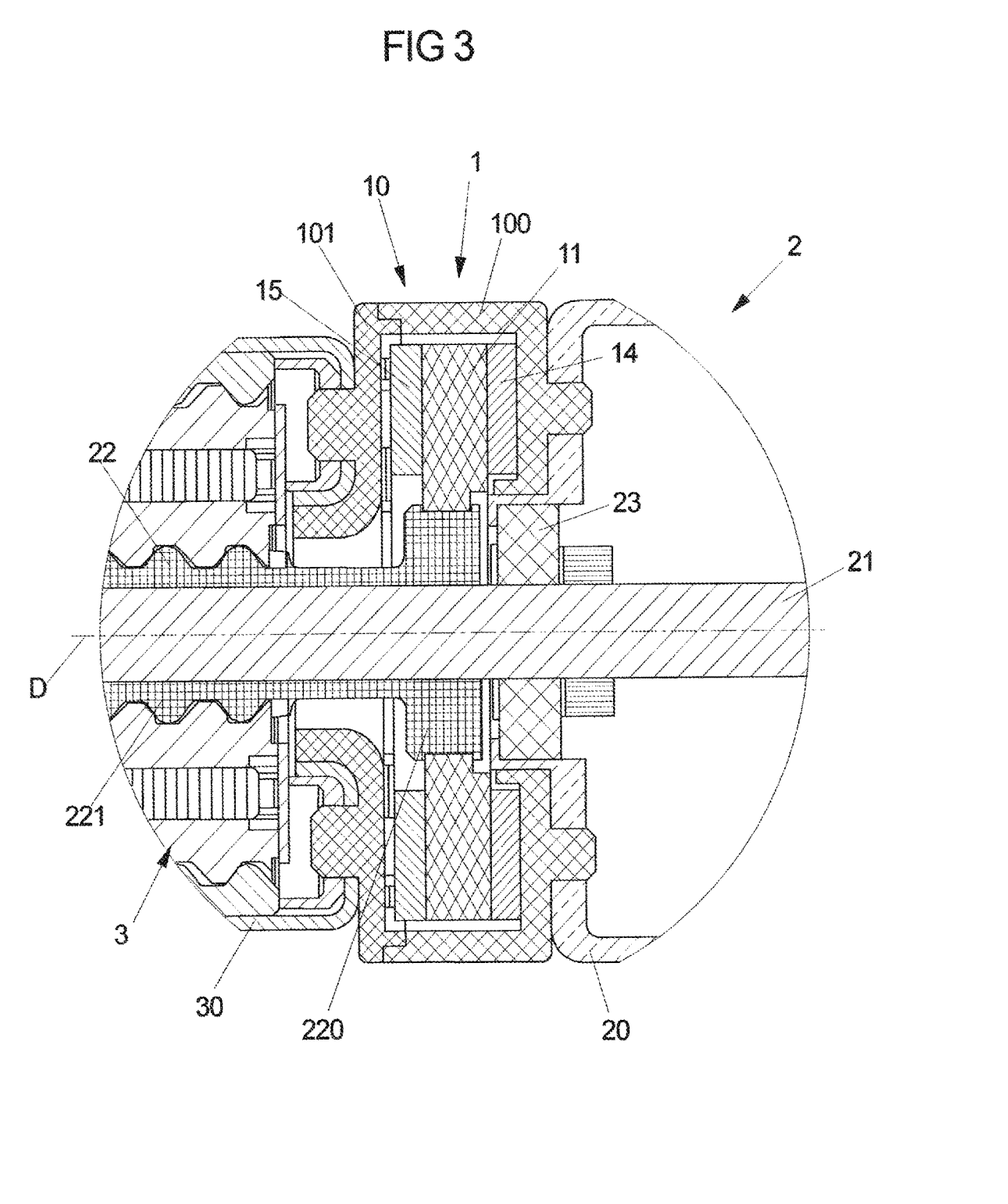
FIG. 3 shows a sectional view of the permanent magnet brake.

The driving device 2 cooperates with a permanent magnet brake 1. Exploded views of this permanent magnet brake 1 are represented in FIGS. 2A and 2B. FIG. 3 shows a sectional view in a sectional plane directed longitudinally along the rotational axis D.

The permanent magnet brake 1 has a stationary portion in the form of a housing 10, which is fixedly connected, on the one hand, to the housing 20 of the driving device 2 and, on the other hand, to a housing 30 of a subordinate gear mechanism 3 (see FIG. 3). The housing 10 comprises two housing part 100, 101, which in the mounted state of the permanent magnet brake 1 are attached to each other and jointly border a receiving opening 102.

In the receiving opening 102 of the housing 10 are arranged a first braking element 11 and two second braking elements 14, 15. The braking elements 11, 14, 15 are respectively configured as annular disks and arranged concentrically to the rotational axis D in the housing 10.

In the represented illustrative embodiment, the first braking element 11 arranged axially between the second braking elements 14, 15 is configured as a permanent magnet disk, while the second braking elements 14, 15 are respectively configured as a steel disk (having ferromagnetic properties). Acting between the first braking element 11 and the second braking elements 14, 15 is a magnetic attraction force, which causes the second braking elements 14, 15 to be drawn respectively toward the first braking element 11.

Between the first braking element 11 and the second braking elements 14, 15 arranged axially on both sides of the first braking element 11 is respectively arranged a friction element 12, 13 in the form of a friction disk concentric to the rotational axis D. Due to the magnetic attraction between the first braking element 11 and the second braking elements 14, 15, the friction elements 12, 13 are respectively in frictional contact, on the one hand, with the first braking element 11 and, on the other hand, with a second braking element 14, 15, wherein the axial distance between the first braking element 11 and an every second braking element 14, 15 is set in a defined manner by the axial thickness of the intervening friction element 12, 13.

The friction elements 12, 13 configured as annular disks can have a very small axial thickness of less than 1 mm, for instance between 0.05 mm and 0.15 mm, for instance 0.1 mm. Between the first braking element 11 and the second braking elements 14, 15 there is thus a very small gap, which is set by the thickness of the respectively intervening friction element 12, 13. The magnetic attraction force between the first braking element 11 and the second braking elements 14, 15 arranged on both sides of the first braking element 11 is thus large and, during operation, at least approximately invariable.

The first braking element 11 is rotatable about the rotational axis D and, to this end, as represented in FIG. 3, is fixedly arranged on a portion 220 of the pinion element 22. The first braking element 11 can be press-molded, for instance, to the portion 220 of the pinion element 22. During operation, the first braking element 11 is thus turned about the rotational axis D together with the pinion element 22 and the output shaft 21 of the driving device 2.

The second braking elements 14, 15, by contrast, are arranged concentrically to the rotational axis D, yet are secured in a rotationally fixed manner relative to the housing 10, in that projections 103, 104 within the receiving opening 102 of the housing 10 engage positively in radially inward pointing recesses 141, 151 on the peripheral outer rim of the second braking elements 14, 15. During operation, the second braking elements 14, 15 thus maintain their rotational position relative to the housing 10, so that, upon a rotary motion of the output shaft 21, the first braking element 11 is moved relative to the second braking elements 14, 15.

The second braking elements 14, 15 are secured in a rotationally fixed manner relative to the housing 10. In this case, however, the second braking elements 14, 15 have a (slight) axial play within the receiving opening 102. The axial position of the second braking elements 14, 15 relative to the first braking element 11 is set by the magnetic attraction between the first braking element 11 and the second braking elements 14, 15 and by the friction elements 12, 13 arranged between the first braking element 11 and the second braking elements 14, 15.

As can be seen from FIG. 2B, the housing parts 100, 101, just like the first and second braking elements 11, 14, 15 and the friction elements 12, 13, respectively have a central opening 105, 106, 110, 120, 130, 140, 150, through which the output shaft 21, with the pinion element 22 arranged thereon, extends.

As can be seen from the sectional view according to FIG. 3, the output shaft 21 of the driving device 2 is mounted via a bearing device 23, for instance a ball bearing, relative to the housing 20 of the driving device 2. The pinion element 22 has an output pinion 221, which is in intermeshing engagement with gearwheels of a gear mechanism 3, so that, upon a rotary motion of the output shaft 21, the gear mechanism 3 is driven by the output pinion 221.

Such a gear mechanism can in principle have any chosen form, so that FIG. 3 should be construed in this context as purely exemplary. For instance, the driving device 2 with a subordinate gear mechanism 3 can realize a spindle drive for the driving of a spindle.

As can be seen from FIG. 3, the housing part 100 is fixedly connected to the housing 20 of the driving device 2 and the housing part 101 is fixedly connected to the housing 30 of the gear mechanism 3. The housing 10 of the permanent magnet brake 1 is thus secured in its position between the housings 20, 30 of the driving device 2, on the one hand, and of the gear mechanism 3, on the other hand.

In the represented illustrative embodiment, the permanent magnet brake 1 is non-switchable and always provides an at least approximately constant braking force. The permanent magnet brake 1 thus produces a sluggishness of movement of the output shaft 21, which can be dimensioned, for instance, such that the driving device 2 can readily overcome the sluggishness in order to move a vehicle part 40, whereas a self-movement of the vehicle part 40 independently of the driving device 2 is not readily possible, or is at least braked.

For instance, the braking effect provided by the permanent magnet brake 1 can be dimensioned such that a tailgate 40 (see FIG. 4), once a set position has been reached, cannot move out of this set position of its own accord.

In the represented illustrative embodiment, the axially central, first braking element 11 is configured as a permanent magnet, while the second braking elements 14, 15 arranged on both sides of the first braking element 11 are configured as steel disks having ferromagnetic properties. However, it is also conceivable to configure one or both of the second braking elements 14, 15 as permanent magnets. In this case, the first braking element 11 can likewise be configured as a permanent magnet or alternatively as a ferromagnetic armature element, for instance as a steel disk having ferromagnetic properties. Crucial in this context is merely that a magnetic attraction force is produced between the braking elements 11, 14, 15.

The first braking element 11, configured as a permanent magnet, can be poled, for instance, such that a North pole points toward one of the second braking elements 14, 15 and a South pole points toward the other second braking element 15, 14.

By selecting the interposed friction elements 12, 13, it is possible to set the braking effect. In particular, by selecting the axial thicknesses of the friction elements 12, 13, it is possible to set the gap between the first braking element 11 and the second braking elements 14, 15, which influences the magnetic attraction force between the braking elements 11, 14, 15, and thus the provided braking force. In general, if the axial distance between the braking elements 11, 14, 15 is increased, the magnetic attraction force, and thus the friction force which is produced between the braking elements 11, 14, 15 and the friction elements 12, 13 and which leads to the braking, is reduced.

The permanent magnet brake 1 is not limited to the use of a first braking element 11 and two second braking elements 14, 15. Rather, it is also conceivable and possible to use more than one first braking element 11 and more than two second braking elements 14, 15, wherein between two second braking elements 14, 15 respectively a first braking element 11 and between two first braking elements 11 respectively a second braking element 14, 15 is arranged.

Figure 5A:
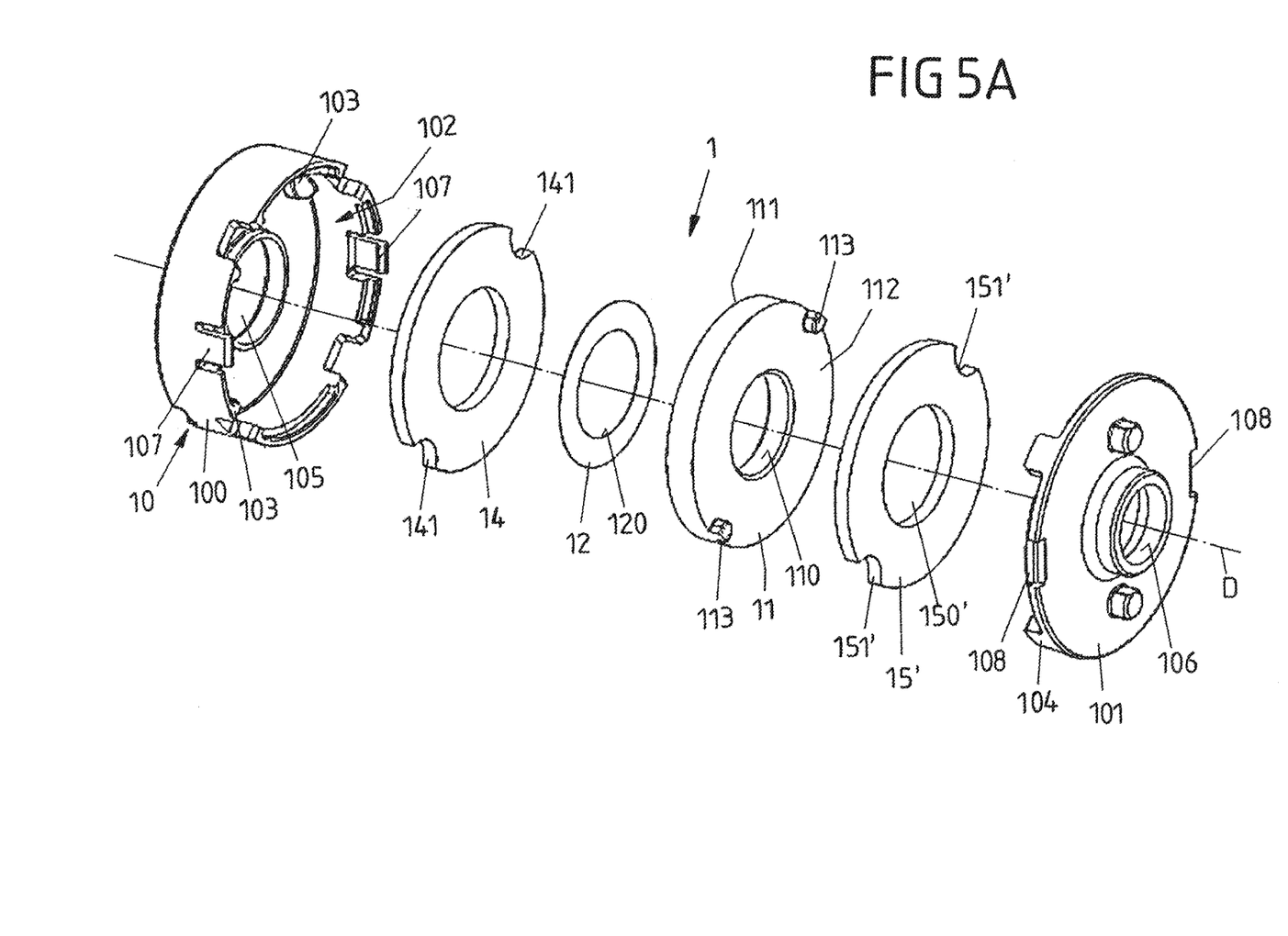
FIGS. 5A, 5B show exploded views of a further illustrative embodiment of a permanent magnet brake.
Figure 5B:
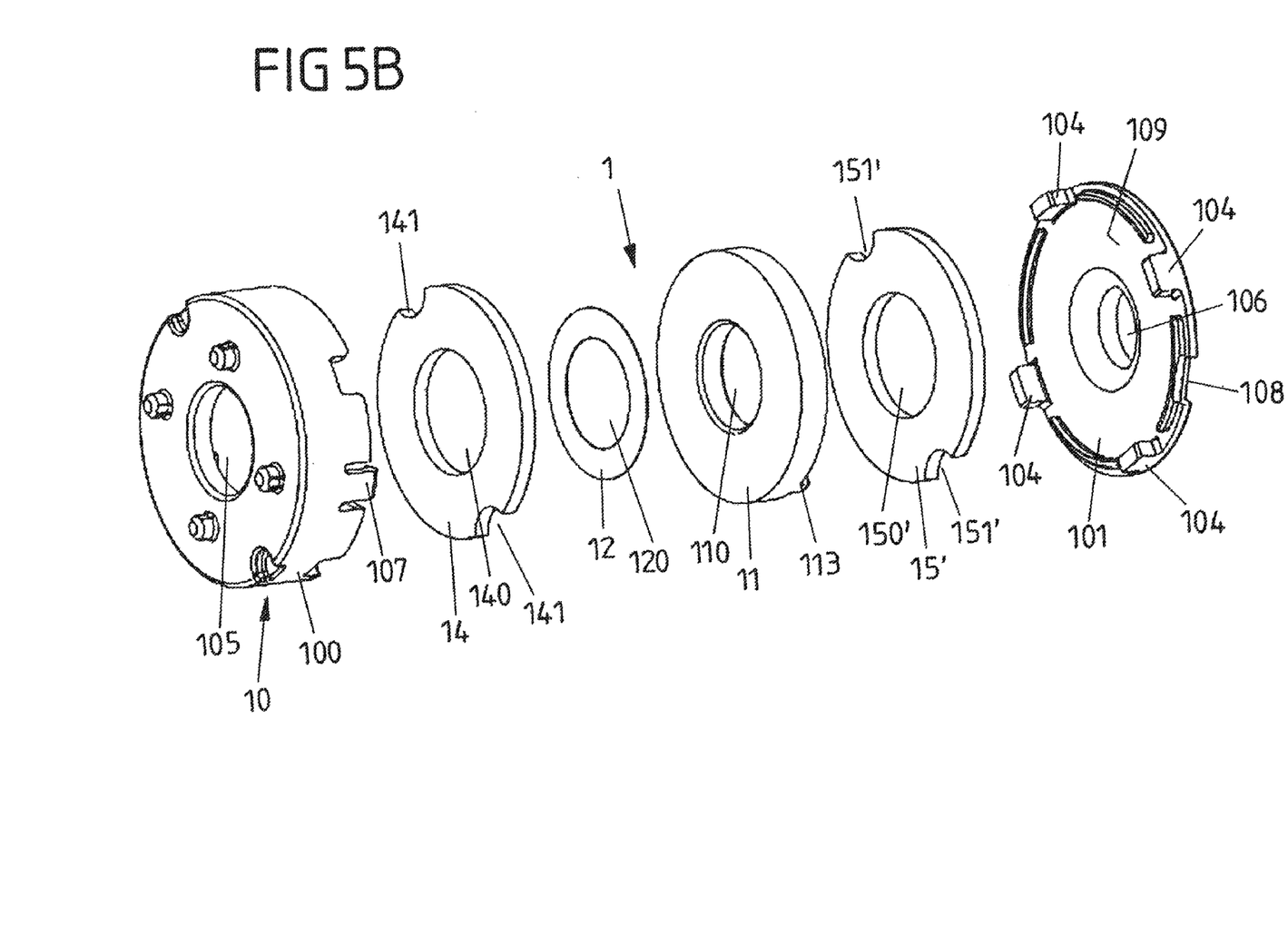
Figure 6:
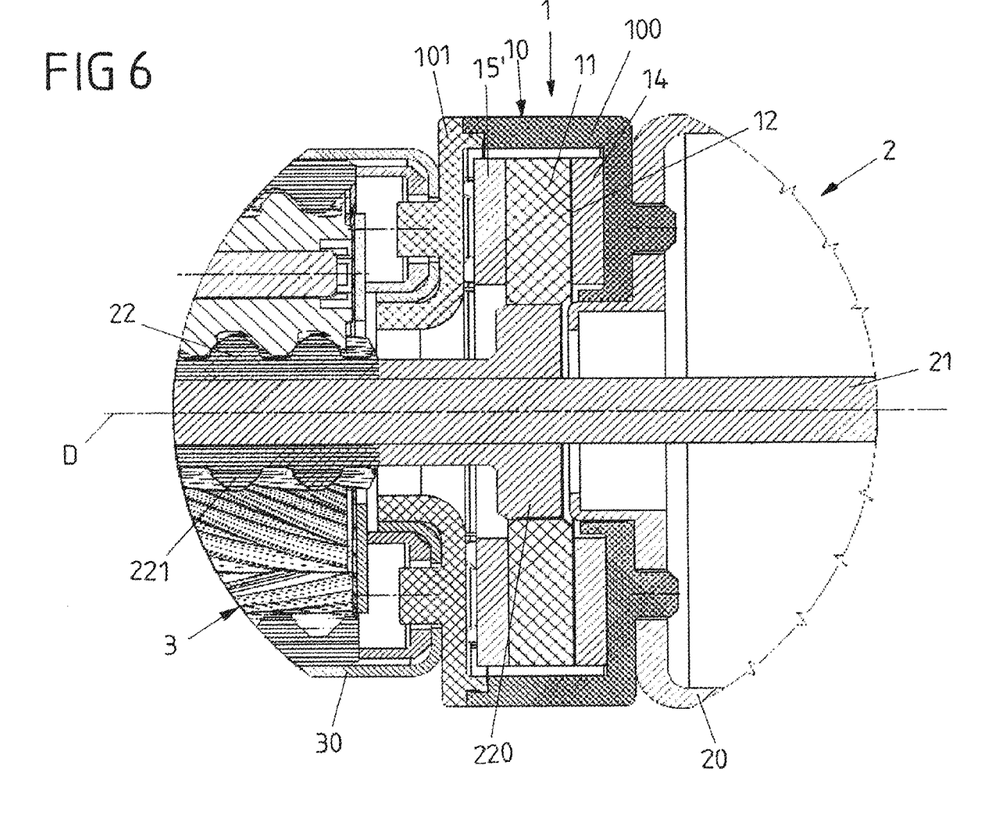
FIG. 6 shows a sectional view longitudinally through the permanent magnet brake.

A further illustrative embodiment of a permanent magnet brake is shown by FIGS. 5A, 5B and 6.

In this illustrative embodiment, a braking element 14 in the form of an armature element formed by a steel disk is arranged in a rotationally fixed manner in a housing part 100. For this purpose, the braking element 14 lies with recesses 141 on the outer periphery of the braking element 14 in engagement with projections 103 within a receiving opening 102 formed in the housing part 100, so that the braking element 14 is held in a rotationally fixed manner on the housing part 100.

The braking element 14 can in this case be movable axially along the rotational axis D at least slightly relative to the housing part 100, so that the braking element 14 is not axially secured relative to the housing part 100.

The housing 10 is completed by a further housing part 101 in the form of a cap, which is to be attached to the housing part 100 and, with projections 104, enters into engagement with associated recesses on the rim of the housing part 100, so that the housing part 101 is held in a rotationally fixed manner on the housing part 100. Moreover, on the housing part 100 are provided latching hooks 107, which establish a latching connection between the housing part 100 and the housing part 101 and, for this purpose, engage in associated latching recesses 108 on the peripheral rim of the housing part 101 when the housing part 101 is attached to the housing part 100.

A further braking element 11 is arranged on the output shaft 21 of the driving device 2, as can be seen from the sectional view according to FIG. 6. To this end, the braking element 11 is secured relative to output shaft 21 via a portion 220 of the output pinion 221, so that, upon a rotary motion of the output shaft 21 about the rotational axis D, the braking element 11 is turned together with the output shaft 21.

In the represented illustrative embodiment, the braking element 11 is configured as a permanent magnet.

To the braking element 11 is connected a disk element 15' in the form of a steel disk, in that the disk element 15', with recesses 151' on the peripheral rim of the disk element 15', is in positive engagement with projections 113 on that side 112 of the braking element 11 which is facing the disk element 15'. Upon a turning of the braking element 11, the disk element 15' is thus turned together with the braking element 11.

As can be seen from the sectional view according to FIG. 6, the disk element 15' lies in the receiving opening 102 of the housing 10 with play relative to the housing part 101. The disk element 15' is thus not in contact with the housing part 101 and, during operation of the driving device 2, provides no (significant) friction forces which would help to increase the braking force of the permanent magnet brake 1.

In this illustrative embodiment, the disk element 15' serves, in particular, as a magnetic yoke, which conducts a magnetic flux of the braking element 11 configured as a permanent magnet.

Between the rotatable braking element 11 and the housing-fixed braking element 14 is arranged a friction element 12, which is configured as an annular disk and can have, for instance, a small axial thickness of less than 1 mm. The friction element 12 defines an axial distance between the braking elements 11, 14, which distance is determined by the axial thickness of the friction element 12. For instance, the thickness of the friction elements 12 can be between 0.05 mm and 0.15 mm, for instance 0.1 mm.

During operation, the braking elements 11, 14 respectively rub against the friction element 12, wherein the friction element 12 is preferably fastened neither to the braking element 11 nor to the braking element 14. The braking force provided by the permanent magnet brake 1 is set by the magnetic attraction between the braking element 11 and the braking element 14, which magnetic attraction determines the friction forces between the braking elements 11, 14 and the friction element 12.

The output shaft 21 extends through the openings 105, 106 in the housing parts 100, 101 and additionally extends through the openings 140, 120 in the braking element 14 and in the friction element 12. The braking element 11 is connected to the output shaft 21 in a rotationally fixed manner, in that the braking element 11 is fixedly connected to that portion 220 of the output pinion 221 which lies in the opening 110 of the braking element 11, for instance is press-molded to the portion 220. The disk element 15' is connected to the braking element 11 in a rotationally fixed manner, but is not itself secured directly to the output shaft 21, which extends through the central opening 150' of the disk element 15'.

Figure 7:
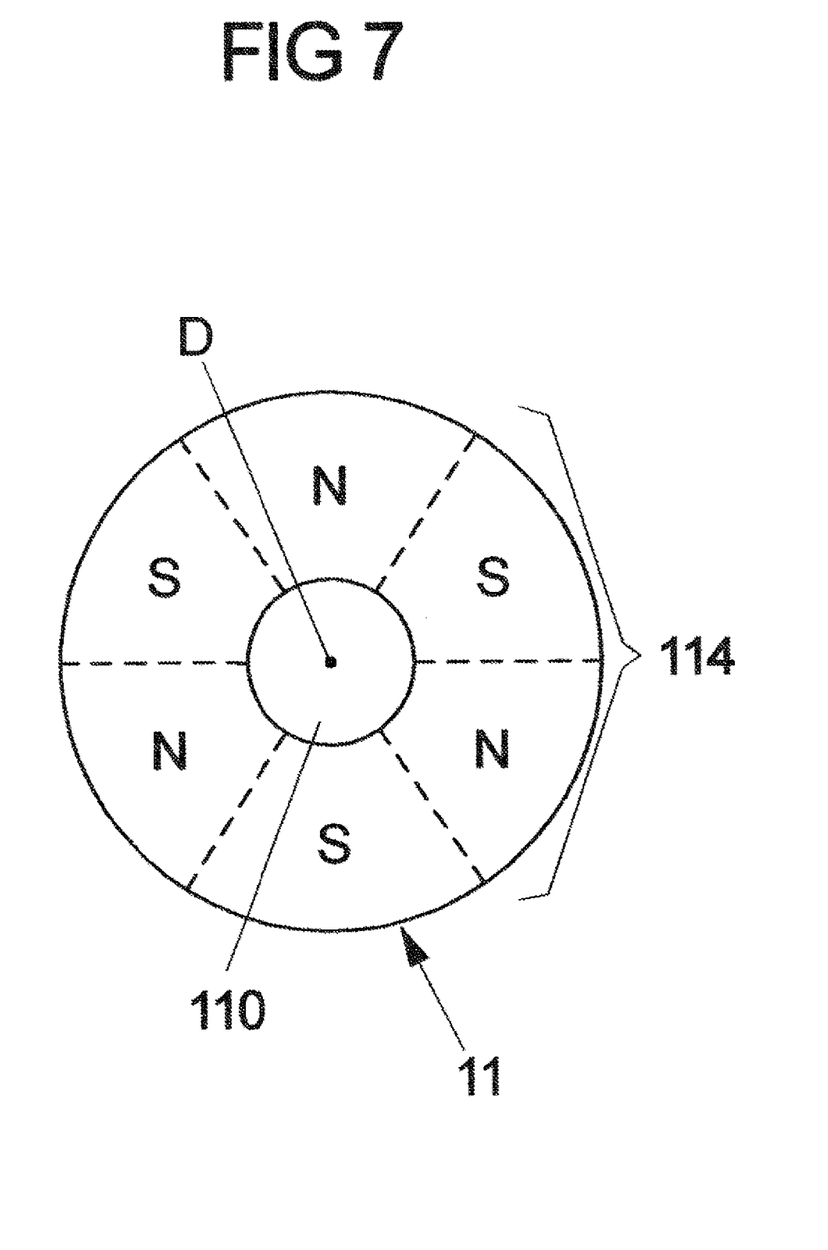
FIG. 7 shows a schematic view of a braking element having magnetic poles which are mutually offset along the peripheral direction.

In the illustrative embodiment according to FIGS. 2A, 2B and 3 and in the illustrative embodiment according to FIGS. 5A, 5B and 6, the permanent magnet of the braking element 11 can be configured as a multipolar magnet, as is illustrated schematically in FIG. 7. In this way, the permanent magnet can have a plurality of N, S magnetic poles, which are mutually offset in the peripheral direction about the rotational axis D and which are arranged alternately to one another about the rotational axis D and are formed by sectors of the annular permanent magnet. For instance, a plurality of, for instance three, four or five, magnetic pole pairs 114 can in this case be present.

By selecting the number of magnetic pole pairs 114, it is possible to set the braking force. In principle, the more magnetic pole pairs 114 are present, the higher is the braking force.

In the illustrative embodiment according to FIGS. 2A, 2B and 3, the braking elements 14, 15 (also) form a magnetic yoke for the magnetic flux produced by the permanent magnet of the braking element 11. Similarly, in the illustrative embodiment according to FIGS. 5A, 5B and 6, the disk element 15' serves as a magnetic yoke.

The braking element 11 configured as a permanent magnet can be produced, for instance, as a sintered part. It is, however, also conceivable and possible, for instance, to produce the braking element 11 as a plastics molding, for instance as a plastics injection molded part, in which case magnetic particles for the provision of the permanent magnet effect are embedded in the plastics material.

The idea on which the invention is founded is not limited to the previously depicted illustrative embodiments, but can in principle also be realized in embodiments of a totally different type.

A permanent magnet effect on a braking element can be achieved by the braking element being produced in total as a permanent magnet, thus from a permanent-magnetic material. It is, however, also conceivable and possible to arrange individual permanent magnet elements on the respective braking element.

In a particularly simple embodiment, the permanent magnet brake is non-switchable. In principle, it is, however, also conceivable to provide a switching device, while using, for instance, an electromagnet by means of which the magnetic force of the permanent magnet can be influenced, and thus the permanent magnet brake switched between different states.

REFERENCE SYMBOL LIST 1 permanent magnet brake
10 housing 100, 101 housing part
102 receiving opening
103, 104 projection
105, 106 opening
107 latching hooks
108 latching recesses
109 inner side
11 permanent magnet disk
110 opening
111, 112 side
113 projection
114 magnetic pole pair
12, 13 friction disk
120, 130 opening
14, 15, 15' armature element
140, 150, 150' opening
141, 151, 151' recess
2 driving device
20 housing
21 output shaft
22 pinion element
220 portion
221 output pinion
23 bearing device
24 push rod
3 gear mechanism
30 housing
4 vehicle
40 tailgate
41 body
D rotational axis
V direction of movement

The invention claimed is:

1. A driving device for moving a tailgate of a vehicle comprising a permanent magnet brake, the driving device comprising:
   a stationary portion,
   a first braking element, which is rotatable relative to the stationary portion about a rotational axis, and
   a second braking element, which is arranged in a rotationally fixed manner on the stationary portion, is axially offset from the first braking element along the rotational axis, and is configured to cooperate with the first braking element in order to generate a braking force,
   wherein the first braking element and/or the second braking element have a permanent magnet or are formed by a permanent magnet, and a magnetic attraction force is configured to act between the first braking element and the second braking element axially along the rotational axis, wherein axially between the first braking element and the second braking element is arranged a friction element, which is in frictional contact with the first braking element and the second braking element,
   wherein the friction element is not rotationally fixed to any of the first braking element and the second braking element, but is configured to interact with the first braking element and the second braking element by friction.

2. The driving device as claimed in claim 1, wherein one of the braking elements has a permanent magnet or is formed by a permanent magnet, and the other of the braking elements has a ferromagnetic armature or is formed by a ferromagnetic armature.

3. The driving device as claimed in claim 1, wherein the second braking element is produced from steel.

4. The driving device as claimed in claim 1, wherein the friction element is produced from a non-magnetic material.

5. The driving device as claimed in claim 1, wherein the first braking element and the second braking element extend respectively in a disk shape about the rotational axis.

6. The driving device as claimed in claim 1, wherein the friction element extends in a disk shape about the rotational axis.

7. The driving device as claimed in claim 1, wherein the second braking element is connected to the stationary portion in a positive-locking manner about the rotational axis for the rotationally fixed securement.

8. The driving device as claimed in claim 1, wherein the second braking element has an axial play relative to the stationary portion.

9. The driving device as claimed in claim 1, wherein two second braking elements are arranged in a rotationally fixed manner on the stationary portion, wherein the second braking elements are arranged on axially different sides of the first braking element, a magnetic attraction force is configured to act between the second braking elements and the first braking element axially along the rotational axis, and between each second braking element and the first braking element is arranged a friction element.

10. The driving device as claimed in claim 1, wherein the first braking element is fixedly arranged on an output shaft of the driving device and is turnable, together with the output shaft, relative to the stationary portion.

11. The driving device as claimed in claim 1, wherein the first braking element has a permanent magnet or is formed by a permanent magnet, and is connected in a rotationally fixed manner to a disk element produced from a ferromagnetic material and providing a magnetic yoke.

12. The driving device as claimed in claim 1, wherein the permanent magnet of the first and/or of the second braking element has a plurality of magnetic poles, which are mutually offset along a peripheral direction about the rotational axis.

13. The driving device as claimed in claim 12, wherein the permanent magnet of the first and/or of the second braking element has a plurality of magnetic pole pairs mutually offset along the peripheral direction, respectively comprising a North pole and a South pole.

14. A driving device for moving a tailgate of a vehicle, comprising a permanent magnet brake, which comprises
   a stationary portion,
   a first braking element, which is rotatable relative to the stationary portion about a rotational axis, and
   a second braking element, which is arranged in a rotationally fixed manner on the stationary portion, is axially offset from the first braking element along the rotational axis and cooperates with the first braking element in order to generate a braking force,
   wherein the first braking element and/or the second braking element have permanent magnet or are formed by a permanent magnet, and a magnetic attraction force acts between the first braking element and the second braking element axially along the rotational axis, wherein axially between the first braking element and the second braking element is arranged a friction element, which is in frictional contact with the first braking element and the second braking element, wherein the stationary portion is formed by a housing having a receiving opening in which the first braking element, the second braking element, and the friction element are arranged.

15. The driving device as claimed in claim 14, wherein the housing is produced from a non-magnetic material.

\* \* \* \* \*